UNITED STATES PATENT OFFICE 2,357,014

FLUX COMPOSITION

Menahem Merlub-Sobel, Jersey City, N. J., and Jerome M. Bialosky, Portsmouth, Ohio, assignors to William L. Ulmer, Cleveland Heights, Ohio No Drawing. Application July 7, 1941, Serial No. 401,332

6 Claims. (Cl. 148—26)

This invention relates to fluxes for brazing and welding, and, in particular, to fluxes for use in such brazing and welding operations as have required, in the past, high concentrations of corrosive fluorides (specifically acid fluorides) in the fluxing medium. Brazing with silver solders comes, especially, within the scope of our invention, both when such silver solder is used because of its relatively low melting point and when it is used because of its capacity for joining and brazing such refractory or oxidizable metals as the chromium-iron alloys, of which stainless steel is the most common example.

It has long been known that, for silver solders and alloys of similar composition, it is necessary to have a flux high in fluoride content, usually in conjunction with boric acid or a borate. Common practice has called for use of potassium or sodium acid fluoride mixed with boric acid or a borate.

When such mixing is effected in the cold, the first reaction occurring is merely the ionic neutralization, by the acid content of the acid fluoride, of the hydroxide formed from the hydrolysis of the borate, all acting in the following sequence:

(1) $K_2B_4O_7 + 7H_2O = 2KOH + 4H_3BO_3$
(2) $2KOH + 2KHF_2 = 4KF + 2H_2O$ which integrates into

$K_2B_4O_7 + 2KHF_2 + 5H_2O = 4H_3BO_3 + 4KF$

It is particularly worthy of notice that no borofluoride is formed under these circumstances, and equally important that neutral potassium fluoride is formed in equimolecular quantity to the boric acid; this is of interest because, though the neutral fluorides have some minor fluxing qualities, they are far inferior to acid fluorides or even to boric acid and the borates in fluxing power.

If, as in some formulas proposed for such soldering and welding, the molecular ratio of bifluoride is more than twice the borate, then the excess bifluoride will react—but for the most part only under the heat of the torch—in the following manner:

$3KHF_2 + H_3BO_3 = KBF_4 + 3H_2O + 2KF$

Once again, it should be noted that an excess of neutral alkali fluoride is formed, adding further to the content of this demi-inert constituent. Much more important is the fact that the formation of three mols of water for each mol of potassium fluoborate means that for each mol of this salt the heat of vaporization of three mols of water will be taken away from the very area where it is most needed. The resulting chilling of the work right where and when heat is desirable must inevitably affect the quality of the weld adversely, especially since, to overcome this drawback, the heating torch must be kept on the work correspondingly longer. Quantitative slowing of production is thus added to the quality factors already mentioned.

Some formulas have proposed the hot mixing of borate solutions with the acid fluoride solutions, which will result, to some extent, in the formation of the alkali fluoborate prior to torch action. To the extent that the borate exceeds the proportions indicated by the reaction

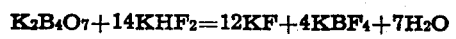
$K_2B_4O_7 + 14KHF_2 = 12KF + 4KBF_4 + 7H_2O$ (approximately 17.6% of borate, with the remainder bifluoride) the solution will be alkaline and this reaction will be impeded. If, on the other hand, the proper ratio is maintained—as is very seldom done—no free borate is available to the flux; this borate is very desirable because of its own fluxing action. In any event, there is always present, in chemically preponderant quantity, the relatively useless, and therefore undesirable, neutral fluoride.

Some of this excess neutral fluoride can be avoided—and this procedure has been proposed in an earlier patent (Valentine, U. S. P. 2,099,582), by using as a flux a mixture of bifluoride and boric acid, which, despite excess boric acid in the proposed formula, will react, either by pre-action or under the torch, as follows:

$3KHF_2 + H_3BO_3 = KBF_4 + 2KF + 3H_2O$

This, however, is still open to grave objections. Unless the reaction is forced to completion, free acidity would remain, and thereby make for a material very corrosive in nature, not only to metals, but even to glass. This can, admittedly, be accomplished, but presents manufacturing difficulties. However, the neutral fluoride problem is by no means adequately solved; there are still two mols of weak and comparatively useless neutral alkali fluoride to every mol of flux-worthy potassium fluoborate, representing a two-thirds dilution.

We have found that, if, instead of attempting to form the fluoborate in situ during torch operations, this compound is used as such, either wholly, or at least significantly more so than possible hitherto, free from neutral fluorides, a far more effective flux is obtained. Such flux is chemically neutral, and is therefore not subject to all the manipulating drawbacks inherent in all compositions containing free bifluoride. (All acid fluorides represent an extreme health hazard on contact with the skin.) The fluoborate owes its efficacy, in all probability, to the fact that it decomposes, at flame temperatures, into neutral and relatively inert alkali fluoride and the highly reactive boron fluoride. This latter compound, $BF_3$, is doubtlessly specifically reactive with metallic oxides, just as silicon fluoride is known to be.

However, even simple fluoborate salts are not completely satisfactory. Under the welding torch, for example, potassium fluoborate fumes badly, and does not wet the work as well as might be desired. Since wetting is an essential factor in the physics-chemistry of fluxing, it is obvious that such fluoborate therefore does not reach the ideal as regard flux requirements. This, too, will explain why, while fluoborates have occasionally been suggested as desirable additional and minor constituents in fluxes for silver solders and the like, they have been out of the question as the predominant factor in a commercial flux.

In our invention, we have found that, if, to a fluoborate composition containing comparatively little concomitant other fluorine compounds, there be added oxy-compounds of boron, such as boric acid or any of the alkali borates, there results a flux which has all the advantages of the fluoborate itself, such as non-corrosiveness, high fluxing activity, etc., yet free from the drawbacks of simple fluoborate, such as fuming and non-wetting. Moreover, the comparative absence of extraneous fluorides makes for high concentration of the active fluxing constituents. By "comparative absence" we refer to all compositions in which there is less than one mol of non-fluoborate fluoride to every mol of fluoborate. It will be recalled that none of the standard procedures yields mixtures with less than two mols of non-fluoborate fluorides to each mol of fluoborate.

As an example of a mixture acid in character—though free from the corrosiveness inherent in compositions containing acid fluorides, we can cite a composition consisting of equal parts of potassium fluoborate and of boric acid, with sufficient water to make a convenient paste.

In general, however, we view alkaline borates as preferable to boric acid, and, specifically, we have found most desirable those compositions in which the alkali content of the borate compound equals, or exceeds, that called for in the pentaborate. The tetraborate, for example, makes an excellent medium for flux formulation. As one example of a composition excellent as a flux, we may cite equal mixtures of potassium fluoborate and potassium tetraborate, again with sufficient water to make a convenient paste.

It is obvious that both the potassium fluoborate and the oxy-borate may be formed in solution, and the paste made in that way. For the fluoborate, it is absolutely essential that free hydrofluoboric acid first be formed by interaction of boric acid with hydrofluoric acid (not an acid fluoride, since this would give the undesirable neutral fluoride contaminant as a concomitant); the hydrofluoboric acid thus formed can then be neutralized by means of alkali carbonate or hydroxide. Alkali borate can similarly be made from boric acid in solution, either simultaneously or separately. Whether premixed, or made in solution, the results are the same—a mixture of fluoborate and oxyborate, with no extraneous fluorine compounds present. Such a mixture can be obtained by interaction of 40 parts by weight of 48% hydrofluoric acid with 47 parts of boric acid, followed by neutralization of the resulting mixture of hydrofluoboric and boric acids by means of 32 grams of potassium hydroxide. The paste resulting from this reaction provides an excellent fluxing medium for silver solder, on both stainless steel and copper-base alloys.

If desired for some special reason, or if present as a contaminant, we have found that non-fluoborate fluorine compounds may be present to some extent without great damage. If, as already indicated, such non-fluoborate fluorides are present in an amount not exceeding mol for mol to the fluoborate content, little damage results, even though, in general, we prefer such extraneous fluorine compounds to be substantially absent.

In addition to alkali present as neutralization agent for the fluoboric acid and boric acid, we may optionally have present, in our fluxes, free alkali in the form of additional hydroxide or carbonate. Such free alkali has, in certain cases, specific fluxing characteristics of its own. Such free alkali should not, however, exceed approximately forty per-cent of the total. As an example of a ternary mixture of this type, we may cite a flux whose solids contents consist of 40 parts by weight of potassium fluoborate, 40 parts of potassium pentaborate (hydrated), and 20 parts of potassium carbonate.

As limitations, we have found that the alkali fluoborate should always be no less than 20% of the total solids content of the flux, nor should it exceed 85% of the total. The oxy-compound of boron, either as boric acid or as an alkali boron compound, should be no less than 15% of the total solids, nor should it exceed 70%. Extraneous fluorine compounds, as previously stated, must under no circumstances exceed the equimolar quantity of the fluoborate present.

We claim:

1. A flux consisting mainly of an alkali fluoborate and an alkali borate more basic than the pentaborate.

2. A flux containing from 20% to 85% of an alkali fluoborate, and from 15% to 70% of an alkali borate more basic than the pentaborate.

3. A flux consisting mainly of an alkali fluoborate and an alkali borate more basic than the pentaborate, any non-fluoborate fluorine compounds present being to an extent no greater than equimolar to the fluoborate.

4. A flux containing from 20% to 85% of an alkali fluoborate, and from 15% to 70% of an alkali borate more basic than the pentaborate, any non-fluoborate fluorine compounds present being to an extent no greater than equimolar to the fluoborate.

5. A flux containing from 20% to 85% of potassium fluoborate, and from 15% to 70% of potassium borate.

6. A flux consisting mainly of potassium fluoborate and a potassium borate more basic than the pentaborate.

MENAHEM MERLUB-SOBEL.
JEROME M. BIALOSKY.